(12) United States Patent
Werker et al.

(10) Patent No.: US 9,469,746 B2
(45) Date of Patent: Oct. 18, 2016

(54) METHOD OF PRODUCING POLYHYDROXYALKANOATE COMPOUNDED PLASTICS HAVING IMPROVED MECHANICAL PROPERTIES

(71) Applicants: Veolia Water Solutions and Technologies Support, Saint-Maurice (FR); University of Queensland, St. Lucia, Queensland (AU)

(72) Inventors: Alan Gideon Werker, Lomma (SE); Mónica Vanessa Arcos Hernández, Estado de México (MX); Bronwyn Glenice Laycock, Thornsland (AU); Steven Pratt, Cleveland (AU); Peter Stig Tomas Johansson, Lund (SE); Per Olof Gösta Magnusson, Lund (SE)

(73) Assignees: Veolia Water Solutions and Technologies Support, Saint-Maurice (FR); University of Queensland, Queensland (AU)

( * ) Notice: Subject to any disclaimer, the term of this patent is extended or adjusted under 35 U.S.C. 154(b) by 0 days.

(21) Appl. No.: 14/652,890

(22) PCT Filed: Dec. 18, 2013

(86) PCT No.: PCT/IB2013/061111
§ 371 (c)(1),
(2) Date: Jun. 17, 2015

(87) PCT Pub. No.: WO2014/097193
PCT Pub. Date: Jun. 26, 2014

(65) Prior Publication Data
US 2015/0291768 A1    Oct. 15, 2015

Related U.S. Application Data

(60) Provisional application No. 61/738,667, filed on Dec. 18, 2012.

(51) Int. Cl.
| | | |
|---|---|---|
| C08K 5/00 | (2006.01) | |
| C08K 5/09 | (2006.01) | |
| C08K 5/04 | (2006.01) | |
| C08L 99/00 | (2006.01) | |
| C08L 67/04 | (2006.01) | |

(52) U.S. Cl.
CPC .................. C08K 5/09 (2013.01); C08L 67/04 (2013.01); C08L 99/00 (2013.01)

(58) Field of Classification Search
CPC ..................................................... C08L 99/00
USPC ....................................................... 524/322
See application file for complete search history.

(56) References Cited

U.S. PATENT DOCUMENTS

| 7,226,765 B2 | 6/2007 | Narasimhan et al. |
| 2002/0143136 A1* | 10/2002 | Noda ..................... B32B 27/20 528/272 |
| 2005/0287653 A1* | 12/2005 | Narasimhan ....... B01D 11/0288 435/135 |

FOREIGN PATENT DOCUMENTS

| WO | 9723549 | 7/1997 |
| WO | 2004013204 A2 | 2/2004 |

*Primary Examiner* — David Karst
(74) *Attorney, Agent, or Firm* — Coats and Bennett PLLC

(57) ABSTRACT

A method of enhancing mechanical properties of compounds formed with polyhydroxyalkanoates (PHA) recovered by biomass where the biomass comprises PHA and non-PHA materials. The method includes dissolving the PHA and non-PHA materials in a solution and separating the PHA and non-PHA materials from the solution. Further, the method includes compounding the separated PHA material and at least some of the separated non-PHA material into a compounded plastic having improved mechanical properties.

26 Claims, 2 Drawing Sheets

METHOD OF PRODUCING POLYHYDROXYALKANOATE COMPOUNDED PLASTICS HAVING IMPROVED MECHANICAL PROPERTIES

RELATED APPLICATIONS

This application is a U.S. National Stage Application of PCT Application No. PCT/IB2013/061111, with an international filing date of 18 Dec. 2013. Applicant claims priority based on U.S. Provisional Patent Application No. 61/738,667 filed 18 Dec. 2012. The subject matter of these applications is incorporated herein.

FIELD OF THE INVENTION

The invention relates to recovering polyhydroxyalkanoates (PHA) from biomass for producing plastic compounds of these polymers.

BACKGROUND TO THE INVENTION

Biodegradable plastics are of increasing industrial interest as replacements or supplements for non-biodegradable plastics in a wide range of applications. One class of biodegradable polymers is polyhydroxyalkanoates (PHAs). PHAs are biopolymers that microorganisms produce as temporary intracellular granules for intermediate storage of energy and carbon. PHAs recovered and purified from biomass exhibit diverse physicochemical properties that can make them suitable for use as ingredients in thermoplastics and elastomers. Compounds of plastics made with these polymers can be biodegraded by soil microbes and so they can be environmentally benign in the product or service as renewable resources and in the material fate in product end-of-life. There has therefore been a great deal of interest in establishing commercial applications for these polymers, particularly for a wide range of applications where biodegradation is integral to the product in service or is critical in end of product life handling.

Currently, the production of PHA relies on fermentation by wild type or genetically engineered pure cultures of bacteria or plants. The current process for manufacture of PHA polymer from microbes typically involves a biomass production stage, and an accumulation stage in which PHA becomes stored by the biomass to significant levels. Such production methods generally have high production costs, thus limiting widespread commercialization of PHA-based plastic compounds for conversion into engineering applications. Current research and practical developments have also been focusing on the use of open mixed cultures in order to lower the polymer production costs. These polymers may be produced using mixed-cultures of microbial biomass fed with waste residuals. This means that a PHA-rich biomass may be produced as an outcome of services in industrial and municipal effluent water quality management activities.

Mixed-cultures of microbial biomass can be enriched through selective environmental pressures in a biological water treatment process to contain a higher proportion of populations of species that can accumulate PHA. PHA is accumulated when such a biomass is stimulated into respiration with supply of readily biodegradable organic matter after having been subjected to a previous period of starvation. The period of starvation is without any supply of such readily biodegradable organic substrate.

Volatile fatty acids represent one commonly used substrate type to produce a PHA in a mixed culture biomass. When mixed cultures of biomass are fed with volatile fatty acids in a controlled way, they will typically accumulate Poly(3-hydroxybutyrate) (PHB), poly(3-hydroxyvalerate) (PHV), and/or copolymers of [Poly(3-hydroxybutyrate-co-3-hydroxyvalerate)] (PHBV). PHB, PHV and PHBV are specific types of PHAs where the specific type and monomer distribution in the PHA is dependent on the type of substrate supplied to the biomass and the methods of the PHA accumulation. The specific type of PHA in a biomass may influence the conditions and requirements, such as the temperatures and kinetics necessary, for the polymer recovery from the biomass.

Recovery of PHA from biomass can be achieved by solvent extraction. PHA extraction from a biomass may or may not require a cell lysing/pre-treatment process, but will typically require the use of an organic solvent as a means to selectively dissolve and separate the polyester from non-dissolved non-PHA cell residue.

The dissolved polymer solubility, once separated from biomass residue, in a PHA rich solvent may be reduced with temperature change, distillation, and/or addition of a more polar co-solvent. Thus a polymer residual can ultimately be separated from the extraction solvent and the polymer may also be further washed with solvents to produce an even purer polymer resin.

Although PHAs may be processed in conventional melt processing equipment, such as extrusion and film blowing, challenges have been encountered. Challenges may be in the material melt processing and/or in the material properties once the material has been formed into a commercial product. For example, PHA containing high levels of 3-hydroxybutyrate monomer may be limited in scope of product application due to brittleness. In some cases, such products of PHA based plastics may not exhibit an acceptable degree of toughness for the intended application. Thus, a need exists for influencing toughness, for example, as well as other mechanical properties of PHA-based plastics.

SUMMARY OF THE INVENTION

The present invention relates to a method for enhancing mechanical properties of plastics formed with compounds of PHA produced by and extracted from a biomass. The method includes providing a biomass comprising extractable PHA and extractable non-PHA material. The biomass is placed in at least one solution and this PHA and non-PHA material in the biomass is selectively dissolved and thereby extracted into the solvent solution by virtue of the chosen solvent and the conditions of time and temperature created for purpose of extraction. Extractable PHA and extractable non-PHA material can in this manner be separated from the remaining non-dissolved non-extractable residual biomass. Thereafter, the extracted PHA is separated from the co-extracted non-PHA material. Once the extracted PHA has been separated from the co-extracted non-PHA material, the method of the present invention entails selectively recombining the separated PHA and, all or at least part of the, separated non-PHA material to form a compounded material having improved mechanical properties. The material properties are improved relative to a compounded plastic formed from the same separated PHA but without including any of the extractable non-PHA material.

Other objects and advantages of the present invention will become apparent and obvious from a study of the following

DESCRIPTION OF THE INVENTION

Figure 1:
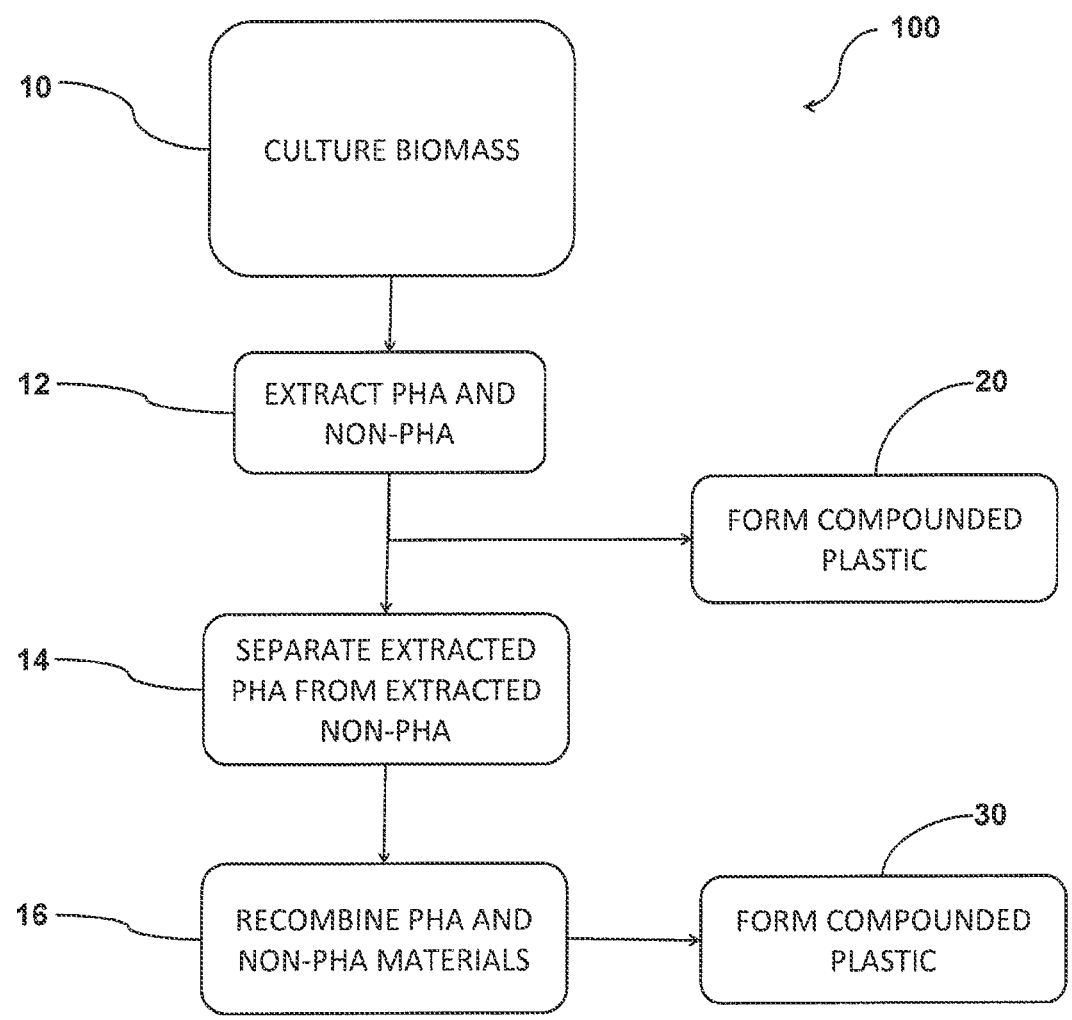
FIG. 1 is a process schematic depicting one embodiment of the invention where PHA and non-PHA are extracted from a biomass.

The present invention relates to a method of enhancing mechanical properties of compounded plastics formed with polyhydroxyalkanoate (PHA) produced from biomass. The method provides a biomass having extractable PHA and extractable non-PHA materials. The biomass is added to a solution, and the extractable PHA and the extractable non-PHA materials become dissolved from the biomass and in the solution. The dissolved material is separated from the non-dissolved biomass residue and then the dissolved materials are further separated into PHA and non-PHA components. The separated components are selectively recombined and processed to form a compounded material having improved mechanical properties relative to a compounded material formed with the PHA but without addition of separated non-PHA material.

The biomass may be from any of a number of sources, and the step of providing a biomass may include utilizing the surplus activated sludge produced as part of municipal or industrial biological wastewater treatment. Such a biomass may comprise naturally occurring bacteria and may be further enriched for such naturally occurring bacteria, which accumulate PHA as intracellular energy and carbon storage granules in the bacterial cells.

There are various approaches to encourage PHA accumulation in the biomass. One example is pulse feeding a reactor, containing a biomass, with organic compounds such as acetic and propionic acids. In such PHA production settings, it is known to those skilled in the art to be able to procure a biomass that is able to accumulate in excess of 30% by weight PHA in the biomass. In many cases, in excess of about 50% by weight PHA may be accumulated in such biomass.

In different proportions, biomass is also comprised of non-PHA constituents that may be broadly categorized as mineral, carbohydrate, lipids and proteins. Some of the non-PHA biomass is extractable along with the PHA. These non-PHA constituents may include lipids and/or fatty acids therefrom. Extractable and non-extractable non-PHA materials in the biomass are considered to be waste residuals in conventional PHA recovery processes.

The lower the PHA content of the biomass the greater will be the relative proportion of dissolved extractable non-PHA material with respect to the dissolved PHA in the extraction solvent given an addition of the same mass of extractable PHA to the extraction process.

The step of placing the biomass in a solution may comprise, for example, placing the biomass in a solution of acetone, butanol, and/or other organic solvents or mixtures thereof. Such solutions are known to promote the step of dissolving the PHA material and the non-PHA material in degree related to time and temperature, thereby bringing the extractable material into solution while leaving remaining non-extractable biomass as a solid residual. The dissolved biomass material comprising extractable PHA and extractable non-PHA is separated from the non-dissolved remaining biomass solid residual and this now separated solution of dissolved material is subjected to a separation step in which the materials are recovered from the solution. Various means including those comprising precipitation and filtration may be utilized to recover the extracted materials from the solvent. Dissolution and precipitation may be controlled by, for example, providing certain temperature regimes and/or by addition of other more polar solvents such as water or methanol to cause the extractable PHA and/or extractable non-PHA to become less soluble and thereby come out of solution. For example, a PHA may be encouraged to dissolve into solution at temperatures between about 120° C. and about 165° C. while non-PHA may become dissolved and extracted from the biomass already at temperatures well below 120° C.

By cooling a solvent mixture with extracted and dissolved PHA and non-PHA materials to temperatures below about 100° C. the PHA may come out of solution while the non-PHA material will remain dissolved. By adding water in addition to cooling the mixture with dissolved PHA and non-PHA materials, both PHA and non-PHA material may be promoted to come out of solution as a solid phase. These suspended solids may be separated from the solution by conventional means such as filtration or centrifugation. The separated suspended solids may be dried leaving a dry recovered PHA together with co-recovered non-PHA material. The solvent may be evaporated and recovered.

The step of separating the dry extracted materials into distinct PHA material and non-PHA material components may further include subjecting the recovered material to, for example, an extraction process using hexane. PHA is not dissolved by the hexane but lipids and fatty acids are. Therefore, the non-hexane-extracted material, when dried, constitutes purified PHA material, and evaporation of the hexane solution provides an oily brown residue that is rich in the non-PHA material.

Alternatively, the step of separating extractable PHA and non-PHA materials from the solution is a process where the PHA is selectively precipitated. An example procedure for separated recovery of extracted PHA and non-PHA materials exploits the fact that the solubility of PHA in the solvent may be more sensitive to temperature than the non-PHA material. For example, both PHA and non-PHA material are co-extracted in a solvent such as acetone or butanol where the solvent temperature is brought between about 120° C. and about 165° C. After separating the extraction solvent from the non-extracted biomass residue, lowering the solvent temperature to below 120° C. reduces the solubility of the PHA leading to PHA precipitation, while the non-PHA material remains in solution.

The degree to which the solvent is separated from the precipitated PHA provides the degree of separation of extractable PHA and extractable non-PHA material. Separating the solvent with non-PHA material from the precipitated PHA and recovering the solvent by evaporation leaves an oily brown residue comprising the extracted non-PHA material. This residue may be further processed and refined before compounding extracted non-PHA material with the extracted PHA. For example, fatty acids mixtures may be separated and purified for specific applications by precipitation, distillation, liquid chromatography, or selective hydrolysis of triglycerides. Other methods include chemical modification with membrane separation.

If the extractable non-PHA material cannot be or is not made to come out of solution together with the PHA, after separation of the extraction solvent from the biomass residue, then evaporation of the solvent with the dissolved or precipitated PHA is one means to combine the PHA and non-PHA materials together after extraction. Precipitation of the PHA and selective partial separation of the solvent before solvent evaporation is a means to combine a selected amount of the non-PHA material with the extracted PHA.

Limits to the maximum degree of separation between PHA and non-PHA materials are to be expected. In our practical experience about 2% of the extracted PHA will remain dissolved in the solvent after conditions for precipitation are created. About 3 percent of the solvent used for the extraction will remain with the recovered PHA after separation of the solvent from the extracted and precipitated PHA. Thus, about 97% of the non-PHA material can be recovered with the solvent after separating the PHA from the solvent after extraction and precipitation of just the PHA. The step of selectively recombining separated PHA and non-PHA materials to form a compounded plastic having improved mechanical properties may include mixing together selected amounts of the separated PHA and the separated non-PHA material along with other additives. Other additives may include but are not limited to ingredients known in the trade as nucleating agents, coloring agents, stabilizers, antioxidants and fillers. The compounded mixture may be formulated by blending in melt processing or blending with solvents to produce a material suitable for melt processing into products for commercial services. For the present invention, this material is referred to as a compounded plastic. The ingredients of the compounded plastic are selected in order to meet requirements for processing this material into products and for the application and conditions imposed on the product in service.

The non-PHA material may have been further refined in advance of utilizing selected portions of the non-PHA material as an ingredient towards forming a compounded plastic. Varying the amount of the co-recovered non-PHA material added to the compounded mixture can be with purpose of achieving specific mechanical properties of the compounded plastic. Such properties are achieved, at least in part, due to the addition of the extracted non-PHA material. Practically important additions of the extracted non-PHA material are in the range from about 4 to about 35 percent of the PHA present in the compounded plastic on a weight basis.

In one embodiment of the present invention, the PHA and non-PHA materials used in the compounded plastic does not necessarily have to be extracted from the same batch of biomass. That is, the method of process of the present invention is applicable to multiple batches of biomass. In particular, the present method also entails a process or method wherein batches of non-PHA material are collected from a number of biomass extractions and the non-PHA material, or components thereof, are compounded with individual or combined batches of PHA extracted from one or more biomass batches.

The method described herein is a process for improving the mechanical properties of PHA (polyhydroxyalkanoate) polymers produced using microbial cultures. Generally, PHA is recovered from a biomass after the PHA content of the biomass has been made to reach a significant level which may be considered to be a biomass PHA content of 30% or greater on a weight basis. This method provides for the improvement of mechanical properties of compounded plastics, formed from extracted PHA by including extracted non-PHA material, or components thereof, that may be co-recovered in a combined form or in a separated form with respect to the extracted PHA during a solvent extraction processes.

The improvements in the compounded plastic material properties may include, for example, increased elongation to break and increased toughness. Such improvements in mechanical properties have been found to be retained by such compounded plastic for extended periods. Thus, the method concerns the recovery of PHA from a biomass with recovery or co-recovery and exploitation of extractable non-PHA materials from the biomass and then using the non-PHA material, in part or in whole, as additives to a PHA compounded plastic for improving mechanical properties and thereby the value of products and services created there from.

Generally, plastics are made from polymers. Plastics may be processed by solvent or melt forming into structures that bring value as products and/or in services. The polymers, like PHA, are compounded with additives that may include but are not limited to chemicals or compounds that serve as nucleating agents, plasticizers, antioxidants, fillers, pigments and so forth. The blending of additives for the purpose of compounding a plastic may be performed in solvent, in dry mixture, and/or in melt processing. Combining of ingredients for the purpose of compounding a plastic may be achieved in batch, in sequential blending steps, during product melt processing, and/or in combinations thereof. The additives derived from the non-PHA extractable materials are directed towards achieving a positive influence on the resultant plastic material mechanical properties relative to the same compounded plastic but without the non-PHA material included.

It is beneficial to recover not only PHA but to also recover other extractable materials from biomass that may serve to bring added value. These extractable non-PHA materials include, for example, long chain fatty acids such as a $C_{16}$ or $C_{18}$ fatty acids, or some combinations thereof. Separating the extracted PHA from the non-PHA materials allows for the separated components to be further refined and be recombined with the recovered PHA in a controlled fashion. By doing so, the plasticity or other properties of the compounded plastic may then be improved upon, based, at least in part, on the amounts of the selected relative proportion of PHA and non-PHA materials that are recombined into the compounded plastic.

Figure 2:
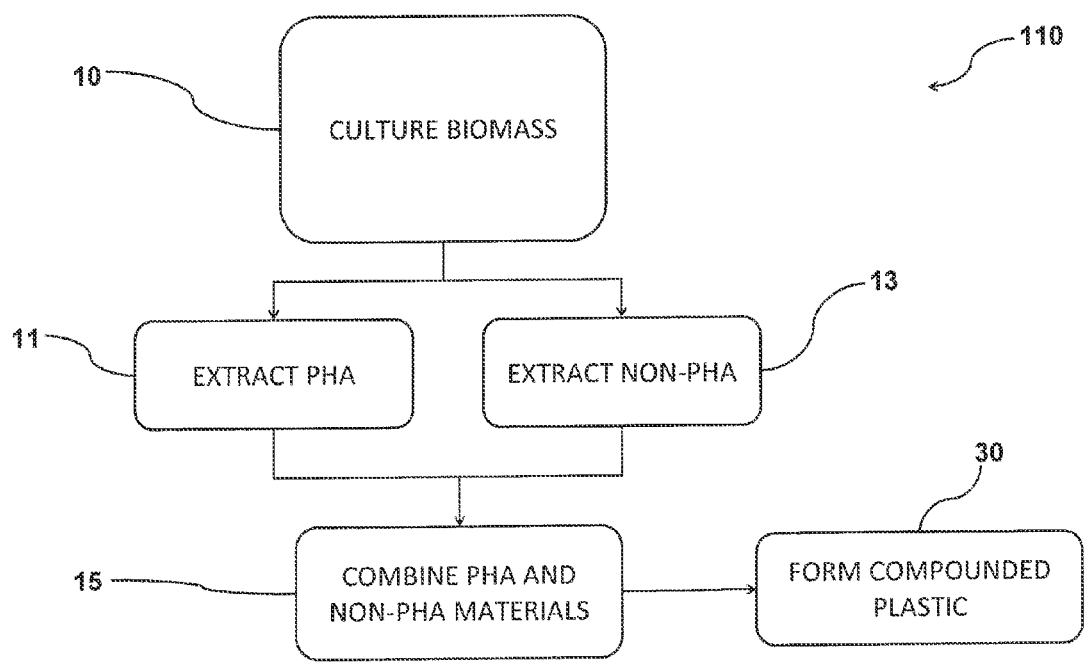
FIG. 2 is a process schematic depicting another embodiment of the invention where PHA and non-PHA are extracted sequentially from a biomass.

Two general approaches for achieving PHA and non-PHA materials recovery towards forming compounded plastics having improved mechanical properties are illustrated in FIGS. 1 and 2. In one mode, indicated generally by the numeral 100 in FIG. 1, a biomass (block 10) is cultured to accumulate a significant amount of PHA using known techniques. The biomass (block 10), having been provided to the PHA recovery process, comprises extractable PHA, and non-PHA materials as well as other non-extractable biomass residues. Non-PHA and PHA materials are extracted together (block 12) during the recovery processing and are subsequently separated in part, or in whole, (block 14) to produce distinct recovered portions of PHA and non-PHA material. These distinct ingredients for plastic compounding may be respectively refined further prior to being recombined (block 16) as will be described further below, and the recombined materials form at least a partially compounded plastic (block 30). Alternatively or additionally, the compounding of the extracted PHA and non-PHA materials may be achieved (block 20) directly from the combined recovered PHA and non-PHA.

In another mode, indicated generally by the numeral 110, and shown in FIG. 2, the extracted non-PHA material is recovered separately from the PHA as shown in blocks 11 and 13. Subsequent combining (block 15) of the separately extracted PHA and non-PHA then provides for forming at least a partially compounded plastic (block 30) from the combined extracted PHA and non-PHA materials.

To further illustrate the method, a mixed microbial culture was used to produce PHA. Extraction was performed using an acetone solution at 125° C. before cooling the solvent and causing precipitation by adding water. Non-PHA extractable material was co-recovered with the PHA. The resulting compound of PHA and non-PHA was subjected to solvent casting to produce a plastic structure in the form of a plastic film. Mechanical properties such as toughness, flexibility, and elongation to break were observed to be greater in the plastic structure or film produced from the compounded PHA with non-PHA extracted material than observed from the same PHA formed, without including the non-PHA material, into a film produced otherwise by the same methods. These improvements in the above-mentioned material properties were observed to persist over extended periods (several months). Purification of the PHA from the co-recovered PHA and non-PHA was by solvent extraction with hexane. Removal of the non-PHA from the PHA through soxhlet extraction using hexane resulted in a purified PHA that showed a loss of these improved properties relative to those of the compounded mixture-based film. When the non-PHA extract material was then re-combined with the purified PHA and this recreated compounded plastic was solvent cast to form a similar film, the improved mechanical properties were observed to be at least partially re-established in the recombined compound-based structure. Details and examples illustrating these effects and demonstrating mechanical property changes with various combinations or recombinations of PHA and non-PHA are provided below.

Batches of Poly(3-hydroxybutyrate-co-3-hydroxyvalerate) or PHBV, a PHA co-polymer, were produced in an activated sludge PHA accumulation pilot plant. The pilot fed batch accumulation reactor of 150 L volume was initiated with 100 L biomass consisting of waste activated sludge mixed liquor obtained from a full-scale municipal wastewater treatment plant. A fed-batch strategy with feed events controlled by dissolved oxygen concentration in the reactor was employed to accumulate PHBV using mixtures of acetic and propionic acids (HAc and HPr) at a total concentration of 50 g COD/L. The substrate was fed in pulses targeting a nominal maximum pulse concentration of 200 mg COD/L. Pulse inputs were triggered by increase in dissolved oxygen concentration relative to the minimum achieved with each pulse, respectively. All accumulations were run for 8 hours.

After accumulation, the mixed liquor was settled and dewatered. PHA-rich concentrated biomass was then centrifuged (15 minutes, 3500 g) to nominally 15% dry solids and then dried at 70° C. PHA and non-PHA materials were extracted from aliquots of biomass by acetone in a closed 1-liter vessel at 125° C. for 2 hours. It is noted that such extractions may occur, more generally, between 120° C. and 165° C. Acetone rich in extractable PHA and non-PHA materials was separated from the non-extractable biomass residue. The PHA and non-PHA materials were recovered from the solvent after adding water. The precipitate was separated from the solvent by filtration, and any remaining solvent was evaporated from the harvested polymer by drying at 70° C.

Samples for mechanical testing were prepared by solvent casting 5% w/v of the extracted, recovered and dried PHA recovered with associated non-PHA material in chloroform. A solvent casting table with a polished mirror surface was used to ensure homogeneous solvent evaporation and uniformity in the thickness of the films. A minimum of 5 hours was allowed for complete solvent evaporation on the table. Samples were then kept at room temperature for at least 2 weeks to allow for slow crystallisation. Thin film strip specimens with average thickness of 0.06±0.01 mm were cut from the casted films with dimensions of 135 mm×22 mm for tensile testing. The measured mechanical properties of the samples comprising a compound of PHA and non-PHA material are listed in Table 1 (identified as "Acc 11 original").

Soxhlet Extraction of PHA and Non-PHA Residue

A sample of 10.510 g of powdered compound with PHA with non-PHA material as produced above was placed in a cellulose thimble (prewashed with hexane and dried) and subjected to soxhlet extraction with 200 mL refluxing hexane over 6 hours. The solid phase was collected and dried to give 8.71 g of a purified PHA product. The hexane solution was then evaporated to give an oily brown residue comprising the non-PHA material and having a mass of 1.8 g. It is evident that the co-recovered compounded PHA and non-PHA material described above [00037] thereby comprised about 83% PHA and about 17% non-PHA material.

Solvent Casting of Purified PHA and Recombined PHA and Non-PHA Material

The 8.71 g of soxhlet rinsed PHA powder was dissolved in 200 mL chloroform (AR grade), filtered through a Whatman filter paper, and divided into 2×100 mL aliquots. To one of these aliquots was added 0.774 g of the oily residue to recreate the compound of PHA and non-PHA materials by re-mixing the respective purified materials from the soxhlet extraction described above. After mixing the respective solutions of purified PHA and re-compounded PHA were then solvent cast and held as per the procedure heretofore described. Test specimens were prepared, and the mechanical properties were measured. The mechanical properties of the polymer films as purified PHA or compounded PHA produced from each aliquot are listed in Table 1 above. In Table 1, "with Acc 11 after hexane extract (soxhlet)" identifies the properties for the purified PHA extract. In Table 1, "Acc 11 after addition of hexane extract" identifies the properties of the re-compounded plastic of the purified PHA and non-PHA materials that had been separated by the soxhlet hexane extraction. The compound reformed was thus about 85% PHA and about 15% non-PHA. Samples of each product were prepared and tested as heretofore described after standing at room temperature under controlled humidity conditions (50%) for 2 weeks.

Subsequent Addition of Non-PHA to Purified PHA

In a separate study, 4.21 g Acc11 solvent cast film was soxhlet extracted in a similar fashion with hexane, to produce 3.60 g of purified PHA and an oily residue (non-PHA material) having a mass of 0.61 g. The purified PHA was redissolved in 80 mL chloroform and 0.63 g of an oily residue of non-PHA collected as a by-product from routine activities of batches of PHA recovery by extraction using butanol. Butanol extraction of PHA from biomass can be applied in a similar fashion to the method of acetone that is described above. However, with butanol extraction a decrease in temperature is sufficient to cause PHA to be recovered as a solid residual from the solvent. No water is added, so the extractable non-PHA material generally remains dissolved in the solvent and can be recovered from the solvent in concentrated form during solvent recovery by evaporation. The 4.21 g of purified Acc11 PHA combined with the 0.63 g of a composite sample of non-PHA material were solvent cast. The composition of the compounded plastic was about 87% PHA and about 13% non-PHA. After again waiting for two weeks, the mechanical properties of this sample were tested. The measured properties are identified as "Acc 11 after addition of Anox extract".

TABLE 1

Effect of Processing Extracts on Mechanical Properties

| | Elongation to Break (%) | Youngs Modulus (Mpa) | Tensile Strength (MPa) | Maximum Load (N) |
|---|---|---|---|---|
| Acc 11 original | 107 (47) | 561 (24) | 5.5 (0.4) | 5.0 (1.2) |
| Acc 11 after hexane extraction (soxhlet) | 3.4 (1.7) | 1014 (198) | 12.7 (1.4) | 8.2 (1.0) |
| Acc 11 after addition of hexane extract (15 wt %) | 13.2 (4.2) | 614 (79) | 6.1 (0.5) | 7.2 (0.6) |
| Acc 11 after addition of Anox extract (15 wt %) | 20.3 (11.5) | 251 (12) | 3.0 (0.1) | 7.0 (0.3) |

Demonstration Using a Model Extract

Oleic acid is one of the compounds known to be present in the extractable non-PHA material due to PHA extraction from biomass. This demonstration illustrates effects of recombining refined non-PHA material comprising oleic acid with pure PHA. Thus the example represents the case that would be expected from a process where oleic acid purified from the extracted non-PHA material and where the oleic acid is subsequently recombined with recovered PHA to produce a compounded plastic.

Batches of PHBV, identified as "CFS19" were produced in an activated sludge PHA accumulation pilot plant. The accumulation produced a PHA co-polymer of 3-hydroxybutyrate with 3-hydroxyvalerate (PHBV). Oleic acid was obtained freshly from Sigma Aldrich (90% purity technical grade) and used as received. The PHBV (90 g) was dried for 8 hours at 70° C. under 100 mm Hg and stored in a desiccator before use (used within 2 hours of removing from oven).

A Brabender mixer was preheated to 135° C. and 35.0 g polymer was added into the mixing chamber while the mixing blades were rotating at 50 r.p.m. For the sample that included oleic acid, 3.5 g were then added directly into the chamber immediately after the PHBV thus producing a mixture having 10% non-PHA material. In each case, the mixture was stirred for 2 minutes at temperature before stopping the mixing and removing the compounded plastic from the chamber. The compounded plastic as produced was then placed in a desiccator and the material was then hot melt pressed on the same day to form a plaque. The hot melt pressing conditions were 185° C. for 2 minutes under 10 tonnes of pressure. At the end of this time the sample was rapidly cooled under pressure to room temperature using water cooling and then removed from the hot press mold. The plaques were then stored for 2 weeks at 25° C. and 50% relative humidity before "dogbone" or "dumbbell" (familiar to those of ordinary skill in materials testing) test specimens were punched from the plaques. The dumbbell dimensions were 2 mm wide, 14 mm long and approximately 1 mm thick in the test section, while overall the samples were 25 mm long.

Samples were tested using a 500 N load cell at extension rates of 20 mm/min. The measured material properties are given in Table 2.

TABLE 2

Effect of model extract (oleic acid) on PHBV properties

| Sample | Mass PHA (g) | Mass oleic acid (g) | # of dogbone specimens tested | Tensile strain at break (%) (mean ± s.d.) | Young's modulus (MPa) (mean ± s.d.) | Tensile strength (MPa) (mean ± s.d.) |
|---|---|---|---|---|---|---|
| CFS19 alone | 35.0 | 0 | 10 | 611 ± 70 | 137 ± 23 | 12.2 ± 1.4 |
| CFS19 with 10 wt % oleic acid | 35.0 | 3.5 | 10 | 807 ± 55 | 91 ± 9 | 11.7 ± 1.4 |

Additional Experimental Embodiments

Although the experimental procedure herein described includes co-extracting PHA and non-PHA materials from a biomass, it is possible to perform extraction of these components separately. One such procedure to accomplish this is to extract the non-PHA materials alone with solvents such as acetone or butanol by controlling the temperature of the solvent so that it is less than the temperature of dissolution of the polymer which for PHB is about 120° C. but for PHBV and PHV much lower than 120° C. in these solvents. In general one may select non-polar solvents and conditions (time and temperature) that do not favour PHA extraction in order to perform a non-PHA extraction of the PHA-rich-biomass. Selected solvent and type of PHA in the biomass will influence the conditions are maintained where more lipophilic non-PHA material tends to dissolve but the PHA remains with the biomass. After the non-PHA material has been extracted, PHA may then be extracted with the same or a different solvent where the temperature of the solvent is between 120° C. and 165° C., as representative of the temperatures where PHAs such as PHB tends to become dissolved as based on practical experience with non-chlorinated solvents.

In another embodiment, the non-PHA and PHA materials may initially be co-extracted, then separated during that extraction process. In this embodiment, PHA and non-PHA extractables are co-extracted, as described above, with solvents like acetone or butanol between 120° C. and 165° C. Instead of precipitating with addition of a polar solvent, however, PHA is allowed to precipitate while the non-PHA extractables primarily remain in solution.

Composition of Co-Extracted PHA and Non-PHA

The experiments described above illustrate combinations of PHA and non-PHA material where the proportion of PHA ranges from about 83% to about 87% and the proportion of non-PHA ranges from about 13% to about 17%. It is evident from this experimentation that the mechanical properties of PHA-based plastics can be influenced by compounding, in part or in whole, non-PHA material extracted from biomass with the extracted PHA material. It is hypothesized that the amount of non-PHA material relative to the amount of PHA in the compounded plastic on a weight basis in such PHA-based compounds can range from 4-35% wt.

What is claimed is:

1. A method of enhancing mechanical properties of compounds formed with polyhydroxyalkanoate (PHA) recovered from biomass, comprising:
   a. providing a biomass comprising PHA and non-PHA materials, wherein the non-PHA materials include lipids or fatty acids;
   b. placing the biomass in at least one solution;
   c. dissolving the PHA and non-PHA materials in the at least one solution, wherein at least part of the biomass is not dissolved;
   d. separating the dissolved PHA and the dissolved non-PHA materials from the non-dissolved biomass;
   e. separating the dissolved PHA from the dissolved non-PHA materials; and
   f. compounding the separated PHA and at least some of the separated non-PHA materials into a compounded plastic including the PHA and having at least one improved mechanical property relative to a compound formed without including the non-PHA materials.

2. The method of claim 1 wherein the dissolving the PHA and non-PHA materials in the at least one solution comprises co-extracting the PHA and non-PHA materials from the biomass.

3. The method of claim 2 wherein the dissolving the PHA and non-PHA materials in the at least one solution includes subjecting the PHA and non-PHA materials to extraction temperatures between 120 and 165° C.

4. The method of claim 1, wherein the compounding the separated PHA and at least some of the separated non-PHA materials into a compounded plastic including the PHA and having at least one improved mechanical property relative to a compound formed without including the non-PHA materials includes selectively re-combining the PHA and non-PHA materials such that the utilized fraction of the non-PHA materials is 4-35% wt. with respect to the PHA weight in the compounded plastic.

5. The method of claim 1 wherein the dissolving the PHA and non-PHA materials in the at least one solution entails a co-extraction process wherein the co-extraction of the non-PHA and PHA materials is phased.

6. The method of claim 5 wherein the dissolving the PHA and non PHA materials in the at least one solution entails the co-extraction process wherein the co-extraction of the non-PHA and PHA materials is phased and the non-PHA material is extracted first leaving at least 90 percent of the extractable PHA material still in the biomass.

7. The method of claim 6 wherein the non-PHA material is extracted first leaving at least 90 percent of the extractable PHA material still in the biomass by maintaining the solution temperature below 120° C.

8. The method of claim 6 wherein the non-PHA material is extracted first leaving at least 90 percent of the extractable PHA material still in the biomass, and wherein the extraction is performed with a non-polar solvent that does not dissolve the PHA independent of temperature.

9. The method of claim 1 wherein the dissolving the PHA and non-PHA materials in the at least one solution includes dissolving the PHA and non-PHA materials into solution together, and wherein the separating the dissolved PHA from the dissolved non-PHA materials includes separately recovering more than 90 percent of the extractable non-PHA material.

10. The method of claim 1 wherein the dissolving the PHA and non-PHA materials in the at least one solution includes dissolving the PHA and non-PHA materials into the solution together and wherein the separating the dissolved PHA from the dissolved non-PHA materials includes selectively bringing the PHA material out of solution by a change in temperature, leaving at least 90 percent of the extractable non-PHA material dissolved.

11. The method of claim 10 wherein the PHA brought out of solution is separated from the solution and the non-PHA materials are subsequently recovered by evaporating the solution.

12. The method of claim 10 wherein the non-PHA material is further refined and wherein the compounding the separated PHA and at least some of the separated non-PHA material into a compounded plastic comprises including only selected components of the non-PHA material in the compounded plastic with the PHA material.

13. The method of claim 1 wherein the dissolving the PHA and non-PHA materials in the at least one solution includes dissolving the PHA and non-PHA materials into the solution together and wherein both the PHA and non-PHA materials are brought out of solution together by a change in temperature and the addition of a more polar solvent than the solution.

14. The method of claim 1 further comprising;
   performing a number of biomass extractions; and
   collecting batches of the non-PHA materials from the number of biomass extractions; and
   wherein the compounding the separated PHA and at least some of the separated non-PHA materials into a compounded plastic includes compounding the non-PHA material, or components thereof, with individual or combined batches of the PHA extracted from the biomass.

15. The method of claim 1, wherein the at least one improved mechanical property includes elongation to break.

16. The method of claim 1, wherein the at least one improved mechanical property includes toughness.

17. A method of enhancing mechanical properties of plastic structures formed with compounds of polyhydroxyalkanoate (PHA) produced from biomass, comprising:
   a. providing a biomass comprising PHA and non-PHA materials, the non-PHA materials including long chain fatty acids or lipids;
   b. placing the biomass in at least one solution;
   c. dissolving the PHA and non-PHA materials in the at least one solution, wherein at least part of the biomass is not dissolved;
   d. separating the dissolved PHA and dissolved non-PHA materials from the non-dissolved biomass;
   e. separating the dissolved PHA from the dissolved non-PHA materials; and f. selectively recombining the separated PHA and the separated non-PHA materials to form a compounded plastic having at least one improved mechanical property relative to a compounded plastic formed exclusive of any of the separated non-PHA materials.

18. The method of claim 17 wherein the dissolving the PHA and non-PHA materials in the at least one solution comprises co-extracting the PHA and non-PHA materials from the biomass.

19. The method of claim 17 wherein the selectively recombining the separated PHA and separated non-PHA materials to form a compounded plastic having at least one improved mechanical property includes recombining the separated PHA and separated non-PHA materials such that the non-PHA material forms 4-35% wt, with respect to the weight of the PHA in the compounded plastic.

20. The method of claim 17 wherein the dissolving the PHA and non-PHA materials in the at least one solution entails a co-extraction process wherein the co-extraction of the PHA and non-PHA materials is phased.

21. The method of claim 17 further comprising:
performing a number of biomass extractions; and
collecting batches of the non-PHA materials from the number of biomass extractions; and wherein the selectively recombining the separated PHA and the separated non-PHA materials to form a compounded plastic includes compounding the non-PHA materials, or components thereof, with individual or combined batches of the PHA extracted from the biomass.

22. The method of claim 17 wherein the dissolving the PHA and non-PHA materials in the at least one solution includes a co-extraction process including first extracting the non-PHA material and thereafter extracting the PHA.

23. The method of claim 22, wherein the first extracting the non-PHA material includes maintaining the temperature of the solution at 120° C. or less while extracting the non-PHA material from the biomass.

24. The method of claim 22 wherein the first extracting the non-PHA material includes performing the extraction with a non-polar solvent.

25. The method of claim 17, wherein the at least one improved mechanical property includes elongation to break.

26. The method of claim 17, wherein the at least one improved mechanical property includes toughness.

* * * * *